(12) United States Patent
Yang

(10) Patent No.: US 6,422,541 B1
(45) Date of Patent: Jul. 23, 2002

(54) BICYCLE CUSHION DEVICE

(76) Inventor: Zhen-Ling Yang, 31-27, Sec. 2, Wan-He Rd., Nan-Twen Dist., Taichung City (TW)

( * ) Notice: Subject to any disclaimer, the term of this patent is extended or adjusted under 35 U.S.C. 154(b) by 0 days.

(21) Appl. No.: 09/803,558

(22) Filed: Mar. 12, 2001

(51) Int. Cl.$^7$ ................................................. F16F 9/04
(52) U.S. Cl. ................ 267/64.11; 267/122; 267/64.27; 267/131; 280/275
(58) Field of Search .................... 267/64.11–64.28, 267/113, 122, 117, 120, 124, 131, 132; 280/275, 276, 279, 278, 283, 284; 297/199, 284.9, 195.1; 248/631

(56) References Cited

U.S. PATENT DOCUMENTS 3,459,441 A * 8/1969 Hornsby
3,599,956 A * 8/1971 Harder, Jr. .................. 267/131

FOREIGN PATENT DOCUMENTS

| DE | 2900780 | * 7/1980 |
| DE | 29706640 | * 8/1997 |

* cited by examiner

Primary Examiner—Douglas C. Butler
(74) Attorney, Agent, or Firm—Charles E. Baxley

(57) ABSTRACT

A bicycle cushion device includes a bracket connected to a bicycle frame which is a movable frame. A bladder is connected to the bracket and a casing is mounted to the bladder and movable connected to the bicycle frame. An opening is defined in a top of the casing and a valve of the bladder extends through the opening. The movable frame moves into the casing and compresses the bladder to absorb the shocks transmitted to the bicycle frame.

2 Claims, 5 Drawing Sheets

BICYCLE CUSHION DEVICE

FIELD OF THE INVENTION

The present invention relates to a bicycle cushion device that has a bladder with a valve connected to a bicycle frame and a casing is movably connected to the bicycle frame and encloses the bladder.

BACKGROUND OF THE INVENTION

A conventional bicycle cushion device generally includes a spring made of metal and one end of the spring is fixedly connected to a bicycle frame and the other end of the spring is connected to a bracket which encloses the spring. When the bicycle is ridden on a rugged road and an upward force is applied to the rear wheel, for example, the seat stays together with the rear wheel are moved upward to compress the spring to absorb the shock, and the rider will not feel too much shock by the operation of the cushion device. However, the metal made spring is heavy in weight which is not welcomed by the riders. Besides, the force of the spring cannot be adjusted according to the road conditions.

The present invention intends to provide an air cushion device that employs a bladder with a valve so that the pressure in the bladder can be adjusted according to needs.

SUMMARY OF THE INVENTION

In accordance with one aspect of the present invention, there is provided a bicycle cushion device and comprising a bracket connected to a bicycle frame and a bladder connected to the bracket. A casing is mounted to the bladder and an opening is defined in a top of the casing so that a valve of the bladder extends through the opening. The casing has two slots defined therethrough and two limit members extend through the slots and are fixedly connected to the bicycle frame.

The primary object of the present invention is to provide a bicycle cushion device having simple structure and the cushion level can be adjusted by changing pressure in the bladder.

These and further objects, features and advantages of the present invention will become more obvious from the following description when taken in connection with the accompanying drawings which show, for purposes of illustration only, several embodiments in accordance with the present invention.

DETAILED DESCRIPTION OF THEE PREFERRED EMBODIMENT

Figure 1:
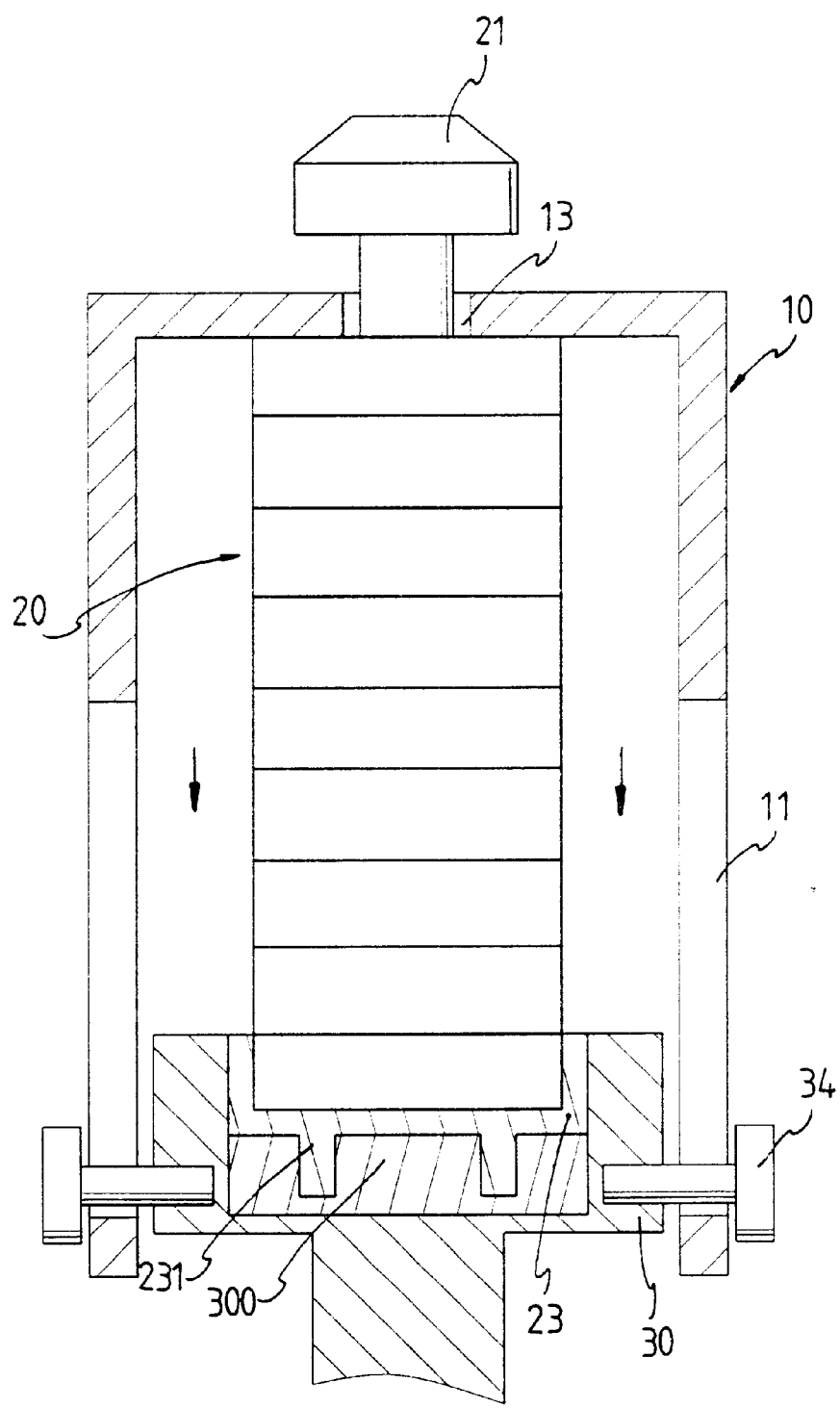
FIG. 1 is a cross sectional view to show the bicycle cushion device of the present invention.
Figure 2:
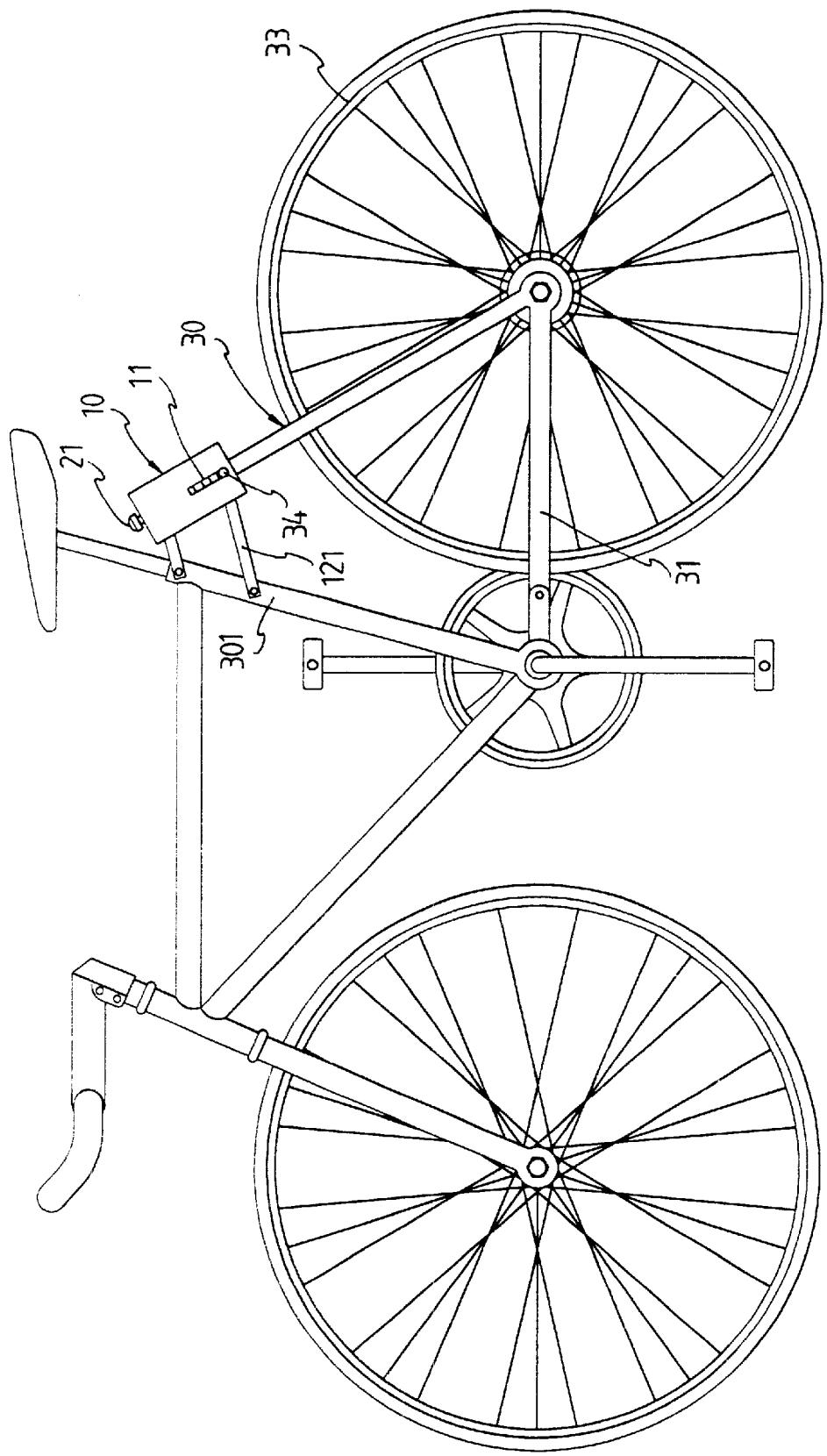
FIG. 2 is a side view to show that the bicycle cushion device of the present invention is used as a rear wheel cushion device.
Figure 3:
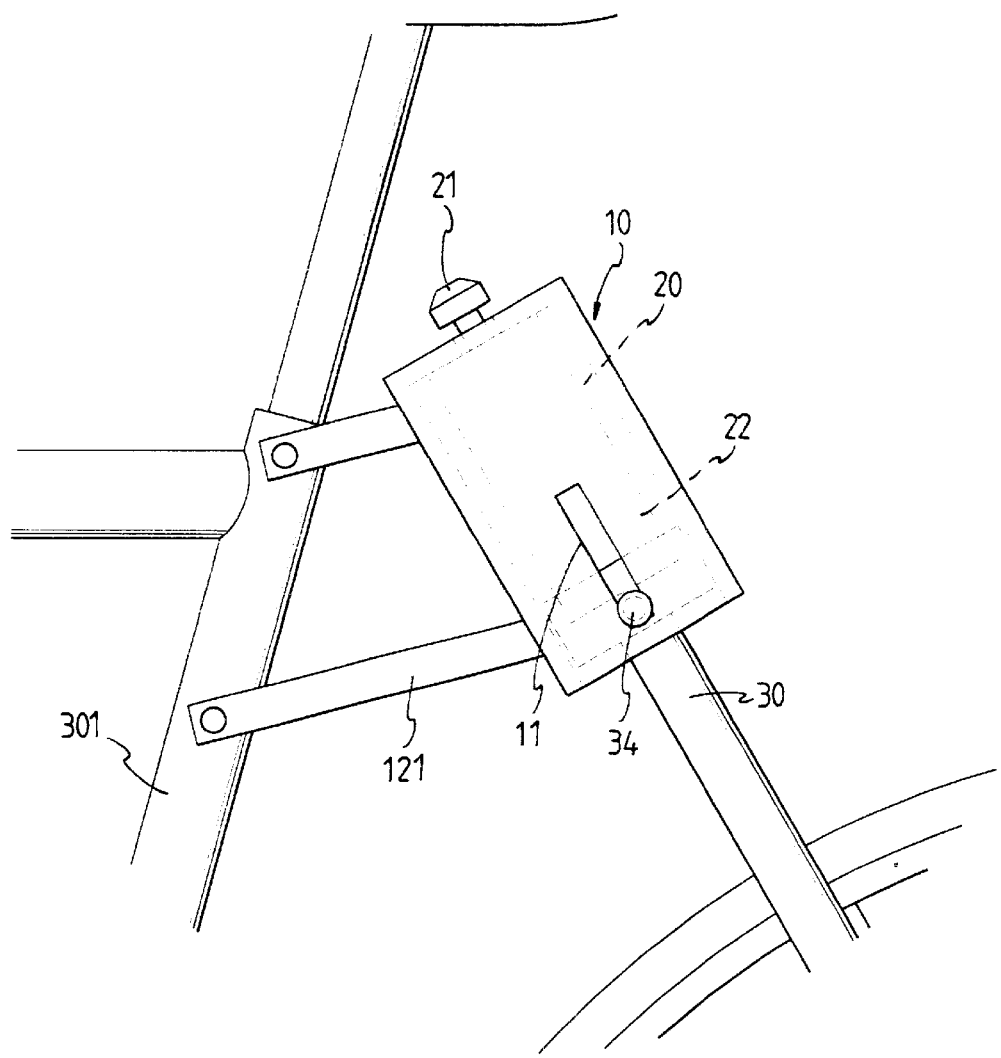
FIG. 3 is a side view to show how the bicycle cushion device of the present invention is connected to the bicycle frame.

Referring to FIGS. 1 to 3, the bicycle cushion device of the present invention comprises a bracket 23 which has two insertions 231 which are connected to an engaging member 300 connected to an end of a seat stay 30. A bladder 20 is connected to the bracket 23 and a casing 10 is mounted to the bladder 20 to position the bladder 20 between the bracket 23 and the casing 10. An opening 13 is defined in a top of the casing 10 and a valve 21 connected to the bladder 20 extends through the opening 13. The casing 10 has two slots 11 defined therethrough and two limit members 34 extend through the slots 11 and are fixedly connected to the seat stay 30.

Figure 4:
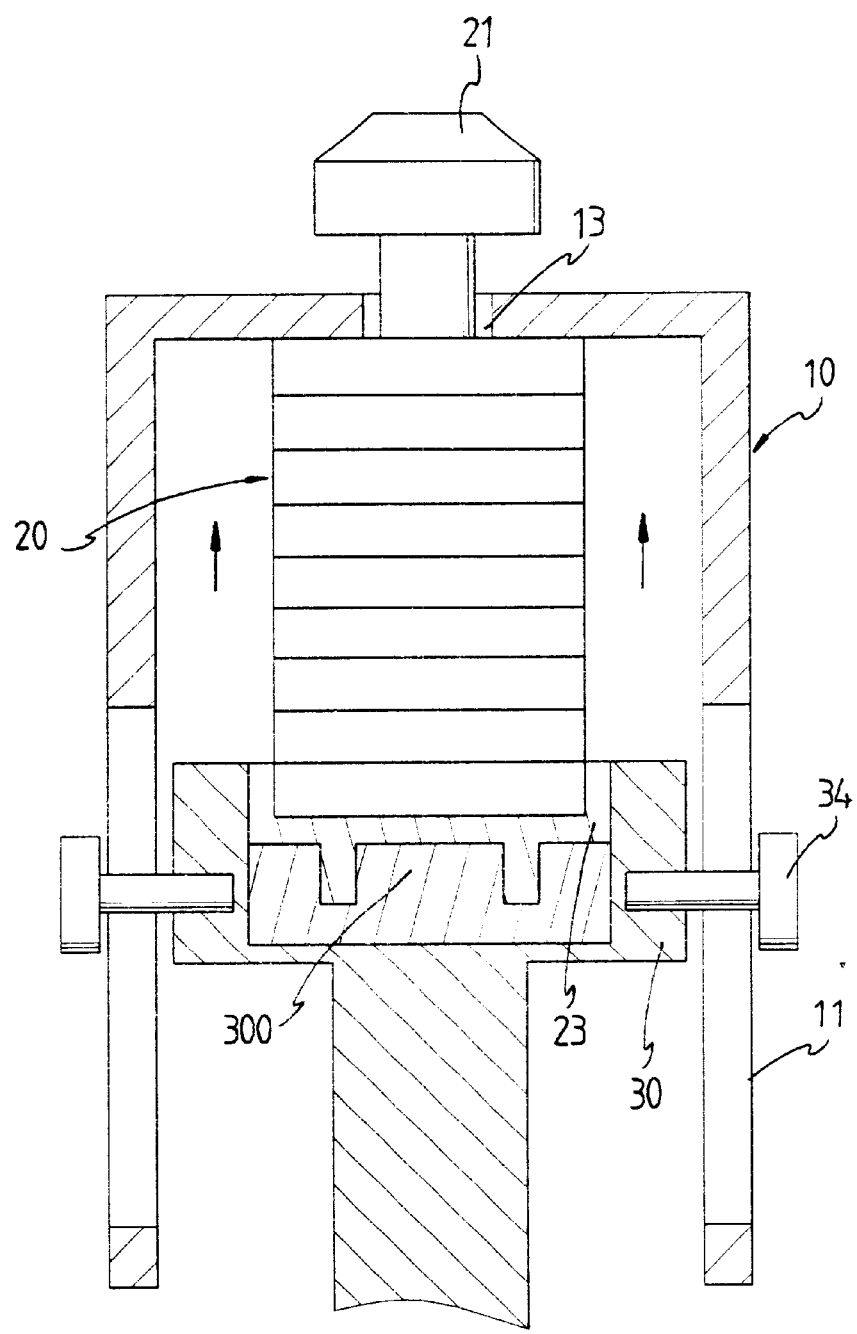
FIG. 4 is a cross sectional view to show that the bicycle cushion device of the present invention is operated to absorb shocks transmitted to the bicycle frame.

Two connection members 121 extend from the casing 10 and are fixedly connected to the seat tube 301. The chain stays 31 are pivotally connected to the bottom bracket of the bicycle. Further referring to FIG. 4, when the bicycle is ridden over a rugged road, the rear wheel 33 is pivoted about the pivot point of the chain stays and the bottom bracket, and the connection members 34 are moved upward in the two slots 11 and the bladder 20 is compressed between the casing 10 and the upward moving bracket 23. By the deformation of the bladder 20, the shocks are absorbed and do not transmitted to the bicycle frame and the rider.

Figure 5:
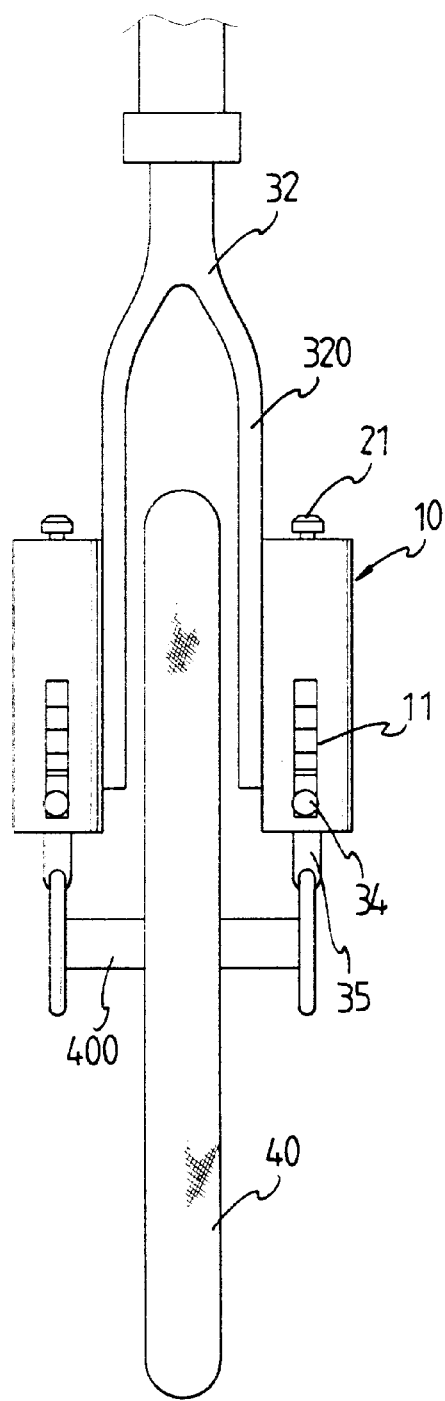
FIG. 5 is a front view to show that the bicycle cushion device of the present invention is used as a front wheel cushion device.

As shown in FIG. 5, the bicycle cushion device may also be used as front wheel cushion device. The casing 10 is connected to each one of two legs 320 of the front fork 32 and each of the bladders in the cushion devices is supported on an extension member 35 which is connected to each end of the front hub 400. Therefore, when shocks are transmitted to the front wheel 40, the front hub 400 is moved upward and compresses the bladders in the cushion devices.

The pressure in the bladder 20 can be adjusted by pumping the bladder 20 via the valve 21 so as to adjust the level of cushion function according the road conditions.

While we have shown and described various embodiments in accordance with the present invention, it should be clear to those skilled in the art that further embodiments may be made without departing from the scope of the present invention.

What is claimed is:

1. A bicycle cushion device comprising:

a bracket adapted to be connected to a bicycle frame and an air bladder connected to said bracket, said air bladder received in a casing which has an open bottom so as to be adapted to receive the bicycle frame from the open bottom, an opening defined in a top of said casing, a valve connected to said air bladder and extending through said opening, two slots defined longitudinally through a wall of the casing and located close to said open bottom of the casing, two limit members movably extending through said slots and adapted to be fixedly connected to the bicycle frame.

2. The bicycle cushion device as claimed in claim 1 wherein the bracket has two insertions which are adapted to be connected to the bicycle frame.

* * * * *